United States Patent
Konno (10) Patent No.: US 11,143,198 B2
(45) Date of Patent: Oct. 12, 2021

(54) IMPELLER MANUFACTURING METHOD, IMPELLER, AND ROTATION MACHINE

(71) Applicant: MITSUBISHI HEAVY INDUSTRIES COMPRESSOR CORPORATION, Tokyo (JP)

(72) Inventor: Yuya Konno, Tokyo (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 221 days.

(21) Appl. No.: 16/491,973

(22) PCT Filed: Mar. 26, 2018

(86) PCT No.: PCT/JP2018/011964
§ 371 (c)(1),
(2) Date: Sep. 6, 2019

(87) PCT Pub. No.: WO2018/181085
PCT Pub. Date: Oct. 4, 2018

(65) Prior Publication Data
US 2021/0123452 A1    Apr. 29, 2021

(30) Foreign Application Priority Data
Mar. 30, 2017    (JP) .............................. JP2017-066755

(51) Int. Cl.
*F04D 29/22*    (2006.01)
*F04D 29/28*    (2006.01)
(Continued)

(52) U.S. Cl.
CPC ............ *F04D 29/284* (2013.01); *B23K 20/12* (2013.01); *F04D 29/263* (2013.01);
(Continued)

(58) Field of Classification Search
CPC .... F04D 29/263; F04D 29/266; F04D 29/281; F04D 29/284; F04D 29/601;
(Continued)

(56) References Cited

U.S. PATENT DOCUMENTS 1,953,064 A * 4/1934 Dowson ................ F04D 29/284
416/186 R
4,231,706 A * 11/1980 Ueda ...................... F04D 29/281
416/186 R (Continued)

FOREIGN PATENT DOCUMENTS

| JP | 2001-1167 A | 1/2001 |
| JP | 2015-101967 A | 6/2015 |
| WO | 2006-117847 A1 | 11/2006 |

OTHER PUBLICATIONS

International Preliminary Report on Patentability issued in Application No. PCT/JP2018/011964, dated Oct. 10, 2019 (8 pages).

*Primary Examiner* — Ninh H. Nguyen
(74) *Attorney, Agent, or Firm* — Osha Bergman Watanabe & Burton LLP (57) ABSTRACT

An impeller 1 according to the present invention includes a disc portion 30 fixed to a rotary shaft 101 that rotates around an axis line O, a cover portion 50 disposed to face the disc portion 30, and a plurality of blade portions 40 provided between the disc portion 30 and the cover portion 50. The impeller 1 includes a first segment SG1 configured of a first disc portion 31 that is a portion of the disc portion 30 on one side of the axis line O, a second segment SG2 in which a second disc portion 35 that is a portion of the disc portion 30 on another side of the axis line O, the cover portion 50, and the blade portions 40 are integrally configured, and a joining layer CL configured to join, by friction welding, the first segment SG1 and the second segment SG2.

1 Claim, 6 Drawing Sheets

(51) Int. Cl.
  *B23K 20/12*  (2006.01)
  *F04D 29/62*  (2006.01)
  *F04D 29/26*  (2006.01)
  *F04D 29/60*  (2006.01)
  *B23K 101/00*  (2006.01)

(52) U.S. Cl.
  CPC ......... *F04D 29/281* (2013.01); *F04D 29/601* (2013.01); *F04D 29/624* (2013.01); *B23K 2101/001* (2018.08); *F05D 2230/60* (2013.01)

(58) Field of Classification Search
  CPC ... F04D 29/624; F05D 2230/60; B23K 20/12; B23K 2010/001
  See application file for complete search history.

(56) References Cited

U.S. PATENT DOCUMENTS

| | | | |
|---|---|---|---|
| 4,285,635 A * | 8/1981 | Leskinen | F04D 29/281 29/889.4 |
| 5,858,142 A * | 1/1999 | Tully | B29C 66/93451 156/73.5 |
| 7,179,050 B2 * | 2/2007 | Hopfensperger | F04D 29/281 415/204 |
| 2010/0215978 A1 | 8/2010 | Rice | |
| 2016/0003257 A1 | 1/2016 | Palomba et al. | |
| 2016/0290354 A1 | 10/2016 | Yagi et al. | |

\* cited by examiner

IMPELLER MANUFACTURING METHOD, IMPELLER, AND ROTATION MACHINE

TECHNICAL FIELD

The present invention relates to an impeller used in a rotary machine.

BACKGROUND ART

For example, a rotary machine such as an industrial compressor, a turbo refrigerator, and a small gas turbine includes an impeller in which a plurality of blades are attached to a disc fixed to a rotary shaft. The rotary machine applies pressure energy and speed energy to gas through rotation of the impeller.

As the impeller, a so-called closed impeller in which a cover is integrally attached to the blades has been well-known. The closed impeller includes an impeller assembled by joining a plurality of members. The impeller including such a joining structure tends to be reduced in performance of the impeller because of low quality of a flow path shape. Patent Literature 1 proposes to configure the impeller as a single piece in order to address the issue.

In Patent Literature 1, in the impeller including a disc portion, blade portions, and a cover portion, the disc portion includes a first member (first segment) and a second member (second segment) that are divided at a division surface orthogonal to an axis line inside the blade portions in the radial direction. Patent Literature 1 proposes to join the first segment and the second segment at the division surface.

According to the proposition by Patent Literature 1, it is possible to improve the quality of the flow path shape and to easily attach/detach the impeller with respect to the rotary shaft.

CITATION LIST

Patent Literature

Patent Literature 1: JP 2015-101967 A

SUMMARY OF INVENTION

Technical Problem

In Patent Literature 1, the first segment and the second segment are joined at the division surface by brazing or friction stir welding.

In the brazing, however, it is necessary to heat the whole of the first segment and the second segment to high temperature of about 900° C., depending on a brazing material. Accordingly, the brazing may vary characteristics of a material configuring the first segment and the second segment. Further, the material realistically applicable to the friction stir welding is limited to a light metal that is relatively low in softening temperature, for example, an aluminum alloy. Accordingly, the friction stir welding is not applicable to an iron-based metal material that satisfies characteristics required for the impeller, or joining strength is unreliable if the friction stir welding is applicable.

Accordingly, an object of the present invention is to provide an impeller manufacturing method that is not limited in metal material to be applied to the first segment and the second segment and does not require heating of the whole of the members to high temperature.

Solution to Problem

The present invention relates to a method of manufacturing an impeller that includes a first segment, a second segment, and a joining layer configured to join a first disc portion of the first segment and a second disc portion of the second segment.

The first segment includes a disc portion fixed to a rotary shaft that rotates around an axis line, a cover portion disposed to face the disc portion, and a plurality of blade portions provided between the disc portion and the cover portion, and is configured of the first disc portion that is a portion of the disc portion on one side of the axis line. In the second segment, the second disc portion that is a portion of the disc portion on another side of the axis line, the cover portion, and the blade portions are integrally configured.

The impeller manufacturing method according to the present invention includes joining, by friction welding, the first disc portion of the first segment and the second disc portion of the second segment while a part of the first disc portion and a part of the second disc portion each corresponding to the joining layer abut on each other.

In the impeller manufacturing method according to the present invention, a drive shaft that applies rotational force can be fixed to any one of the first segment and the second segment. In addition, in the impeller manufacturing method according to the present invention, the drive shaft can be rotated while friction pressure is applied between the first disc portion and the second disc portion through the drive shaft.

In the impeller manufacturing method, the drive shaft is preferably fixed to the first segment.

In this case, the drive shaft is preferably drawn to outside of the second segment through an insertion hole of each of the first segment and the second segment into which the rotary shaft is to be inserted.

According to the present invention, an impeller that includes a first segment, a second segment, and a joining layer configured to join, by friction welding, a first disc portion of the first segment and a second disc portion of the second segment is provided.

The first segment includes a disc portion fixed to a rotary shaft that rotates around an axis line, a cover portion disposed to face the disc portion, and a plurality of blade portions provided between the disc portion and the cover portion. The first segment is configured of a first disc portion that is a portion of the disc portion on one side of the axis line. In the second segment, a second disc portion that is a portion of the disc portion on another side of the axis line, the cover portion, and the blade portions are integrally configured.

Further, according to the present invention, a rotary machine that includes the above-described impeller is provided.

Advantageous Effects of Invention

In the impeller according to the present invention, the first segment and the second segment are joined with the joining layer by the friction welding. As a result, according to the present invention, sufficient joining strength is obtainable even when stainless steel that cannot provide sufficient joining strength in friction stir welding is used for the first segment and the second segment.

In addition, in the friction welding, there is a part heated to high temperature by frictional heat; however, the part is limited to the joining layer and in the vicinity thereof.

Accordingly, a range receiving thermal influence is narrow as compared with brazing in which the members are wholly heated in a furnace. Therefore, the impeller according to the present invention makes it possible to minimize variation of material characteristics caused by joining as well as to suppress deformation caused by application of heat. In other words, according to the present invention, it is possible to provide the impeller high in accuracy of the shape and the dimension.

DESCRIPTION OF EMBODIMENT

A centrifugal compressor 100 that is an example of a rotary machine according to an embodiment of the present invention is described below with reference to accompanying drawings.

[Configuration of Centrifugal Compressor 100]

Figure 1:
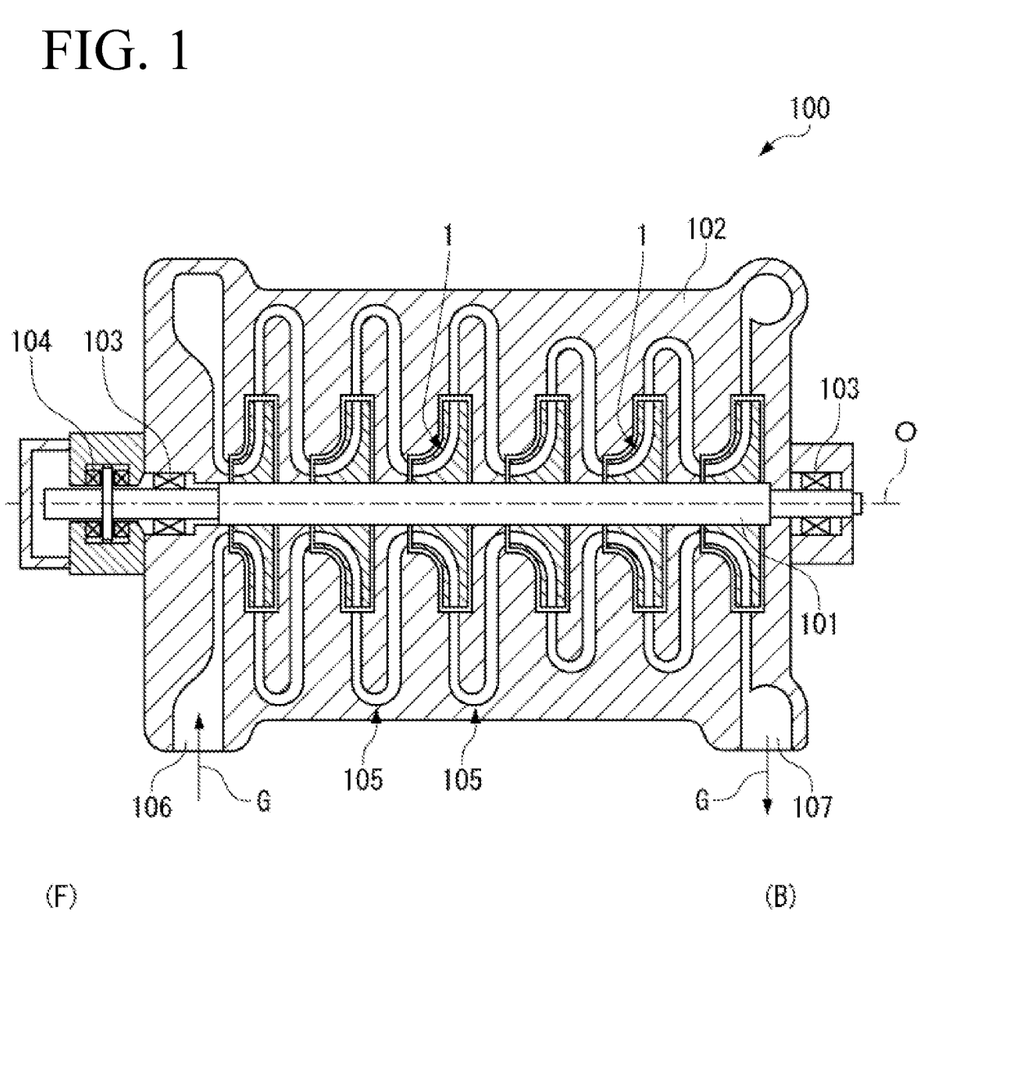
FIG. 1 is a cross-sectional view illustrating a centrifugal compressor according to an embodiment of the present invention.

As illustrated in FIG. 1, the centrifugal compressor 100 according to the present embodiment includes a casing 102 and a rotary shaft 101 that is supported by the casing 102 through a journal bearing 103 and a thrust bearing 104. The rotary shaft 101 is supported so as to be rotatable around an axis line O, and a plurality of impellers 1 that are arranged in the axis line O direction are attached to the rotary shaft 101.

Figure 2:
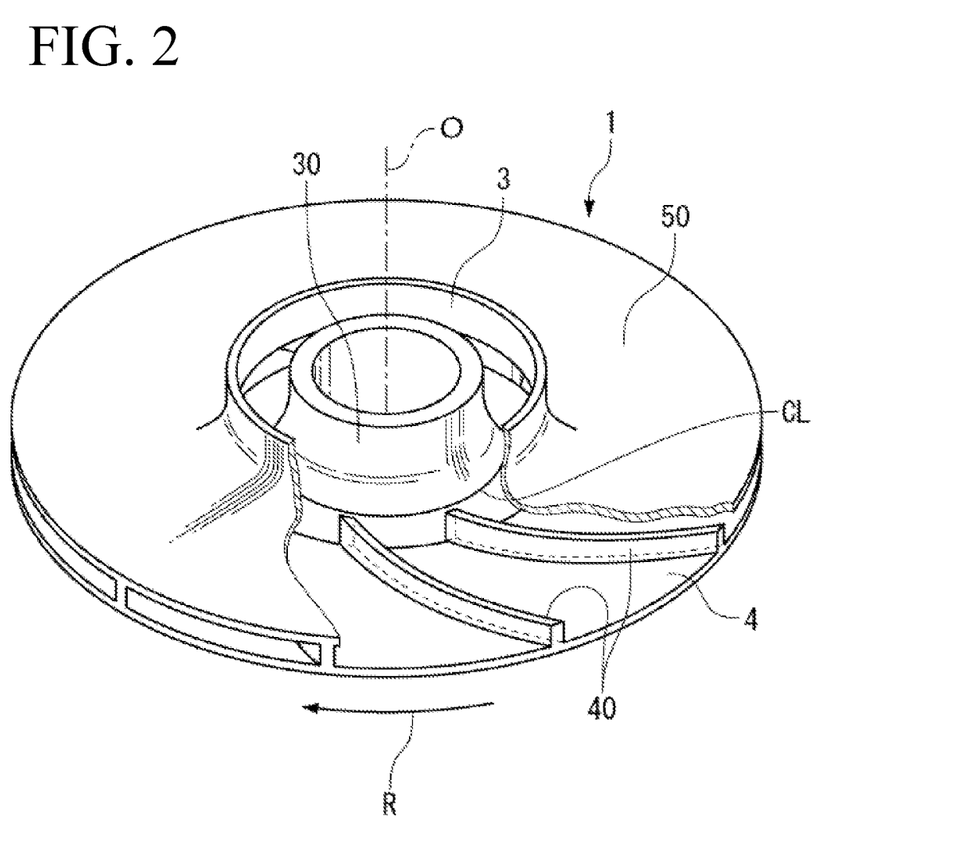
FIG. 2 is a perspective view illustrating an impeller according to the present embodiment.

As illustrated in FIG. 2, each of the impellers 1 includes a substantially disc shape. Each of the impellers 1 is configured to discharge fluid sucked from an induction port 3 that opens on one side of the axis line O direction, from a discharge port 4 on outside in a radial direction through a flow path 105 (see FIG. 1) that is provided inside each of the impellers 1.

The impellers 1 use centrifugal force derived from rotation of the rotary shaft 101 to stepwisely compress gas G supplied from the flow path 105 on upstream side provided in the casing 102, and cause the compressed gas G to flow toward the flow path 105 on downstream side.

As illustrated in FIG. 1, the casing 102 includes, on front side (F) in the axis line O direction of the rotary shaft 101, a suction port 106 to take in the gas G from the outside. Further, the casing 102 includes, on rear side (B) in the axis line O direction, a discharge port 107 that causes the gas G to flow out to the outside.

In the centrifugal compressor 100, when the rotary shaft 101 rotates, the gas G flows into the flow path 105 from the suction port 106, the gas G is stepwisely compressed by the impellers 1, and the compressed gas G is discharged from the discharge port 107. FIG. 1 illustrates an example in which six impellers 1 are provided in series on the rotary shaft 101; however, it is sufficient to provide at least one impeller 1 on the rotary shaft 101. Note that, in the following description, a case where only one impeller 1 is provided on the rotary shaft 101 is described as an example, to simplify the description.

[Configuration of Impeller 1]

Figure 3:
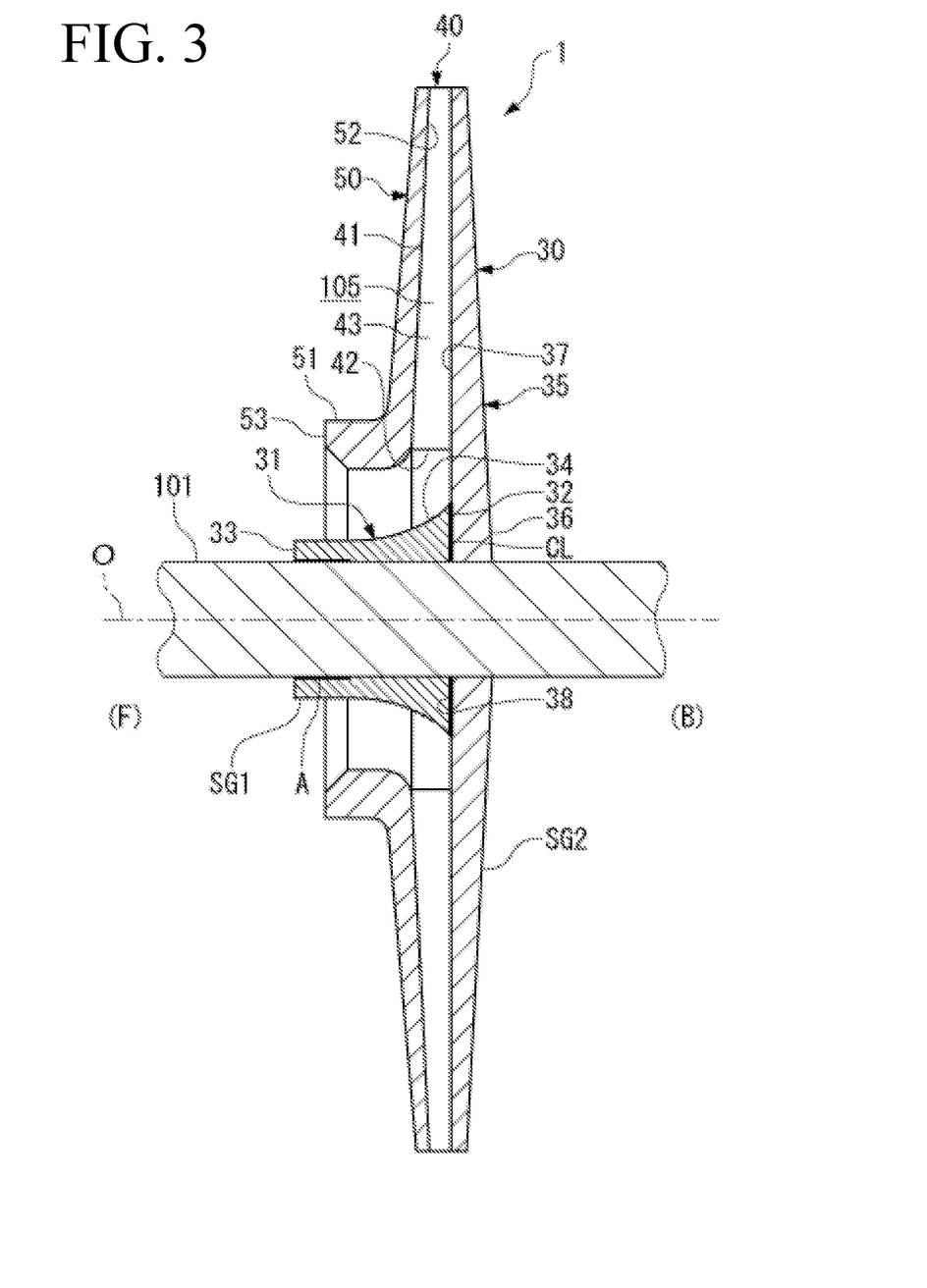
FIG. 3 is a cross-sectional view illustrating the impeller according to the present embodiment.

As illustrated in FIG. 2 and FIG. 3, the impeller 1 includes a disc portion 30, blade portions 40, and a cover portion 50.

The disc portion 30 is attached to the rotary shaft 101 through fitting. As illustrated in FIG. 3, the disc portion 30 includes a first disc portion 31 and a second disc portion 35 that are divided in the axis line O direction at a joining layer CL orthogonal to the axis line O. The first disc portion 31 that is a portion on one side in the axis line O direction and the second disc portion 35 that is a portion on the other side in the axis line O direction are joined with the joining layer CL.

The first disc portion 31 includes a substantially cylindrical shape with the axis line O as a center. The first disc portion 31 includes, on front end part 33 side on the front side (F) of the axis line O, a grip part A that is fitted to the rotary shaft 101 with an interference. At this time, to fit the first disc portion 31 to the rotary shaft 101 with the interference at the grip part A, cold fitting or shrink fitting is adoptable. The impeller 1 according to the present embodiment is fixed to the rotary shaft 101 at only the grip part A.

The first disc portion 31 includes an outer peripheral surface 34 that is gradually increased in diameter toward the rear side (B) of the axis line O. The outer peripheral surface 34 has a curved surface recessed outward in a cross-section including the axis line O.

A rear end surface 32 of the first disc portion 31 on the rear side (B) of the axis line O is joined to the second disc portion 35 with the joining layer CL by friction welding.

The second disc portion 35 includes a disc shape that extends outward in the radial direction from a rear end part 36 side that is opposite to the front end part 33 side in the axis line O direction.

An inner-diameter-side region 38 on a front end surface 37 of the second disc portion 35 is joined to the rear end surface 32 of the first disc portion 31 with the joining layer CL. The rear end surface 32 and the inner-diameter-side region 38 of the front end surface 37 configure the joining layer CL orthogonal to the axis line O.

The joining layer CL is formed by friction welding. A method of joining the first disc portion 31 and the second disc portion 35 by the friction welding is described later.

As illustrated in FIG. 2, the plurality of blade portions 40 are arranged at predetermined intervals in a circumferential direction of the disc portion 30.

As illustrated in FIG. 3, each of the blade portions 40 is formed to have a substantially constant plate thickness, and protrudes from the front end surface 37 of the disc portion 30 toward the front side (F) in the axis line O direction. Further, each of the blade portions 40 has a slightly tapered shape toward the outside in the radial direction in a side view.

As illustrated in FIG. 2, each of the blade portions 40 is formed so as to be directed to rear side in a rotation direction R of the impeller 1 as going toward the outside in the radial direction of the disc portion 30 as viewed from the axis line O direction. Further, each of the blade portions 40 is formed so as to be curved in a recessed shape toward the rear side in the rotation direction R as viewed from the axis line O direction. The example in which each of the blade portions 40 is curved as viewed from the axis line O direction has been described here; however, it is sufficient for each of the blade portions 40 to extend to the rear side in the rotation direction R as being closer to the outside in the radial direction. For example, each of the blade portions 40 may be linearly provided as viewed from the axis line O direction.

As illustrated in FIG. 3, the cover portion 50 is disposed to face the disc portion 30, and covers the blade portions 40 from the front end part 33 side in the axis line O direction.

A rear end surface 52 of the cover portion 50 in the axis line O direction is formed integrally with front side edges 41 of the respective blade portions 40. The cover portion 50 is formed in a plate shape in which a thickness dimension on the outside in the radial direction is slightly small, as with the thickness dimension of the disc portion 30. The cover portion 50 includes a bent part 51 that is bent toward the front side in the axis line O direction at positions of inside ends 42 of the respective blade portions 40.

The impeller 1 including the above-described configuration includes the joining layer CL that is disposed on the inside in the radial direction of the blade portions 40. Further, the front end part 33 of the first disc portion 31 is disposed to protrude toward the front side (F) in the axis line O direction more than a front end edge 53 of the bent part 51. Moreover, in the impeller 1, the flow path 105 through which the gas G flows is formed by the outer peripheral surface 34 of the first disc portion 31, the front end surface 37 of the second disc portion 35, side surfaces 43 of the blade portions 40, and the rear end surface 52 of the cover portion 50.

In the impeller 1, the first disc portion 31 configures a first segment SG1, and the second disc portion 35, the blade portions 40, and the cover portion 50 configure a second segment SG2.

In the impeller 1 according to the present embodiment, the first segment SG1 and the second segment SG2 are each made of a metal material, for example, precipitation-hardening stainless steel such as JIS SUS630.

[Method of Manufacturing Impeller 1]

Next, a method of manufacturing the above-described impeller 1 is described with reference to FIGS. 4A, 4B to FIG. 6.

Figure 4A:
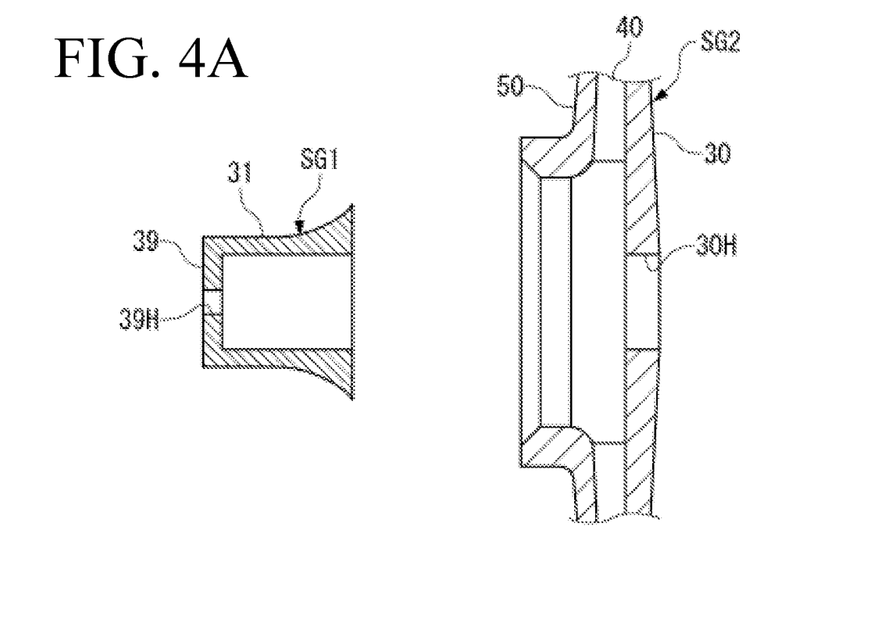
FIGS. 4A and 4B are cross-sectional views illustrating a procedure of manufacturing the impeller according to the present embodiment.
Figure 6:
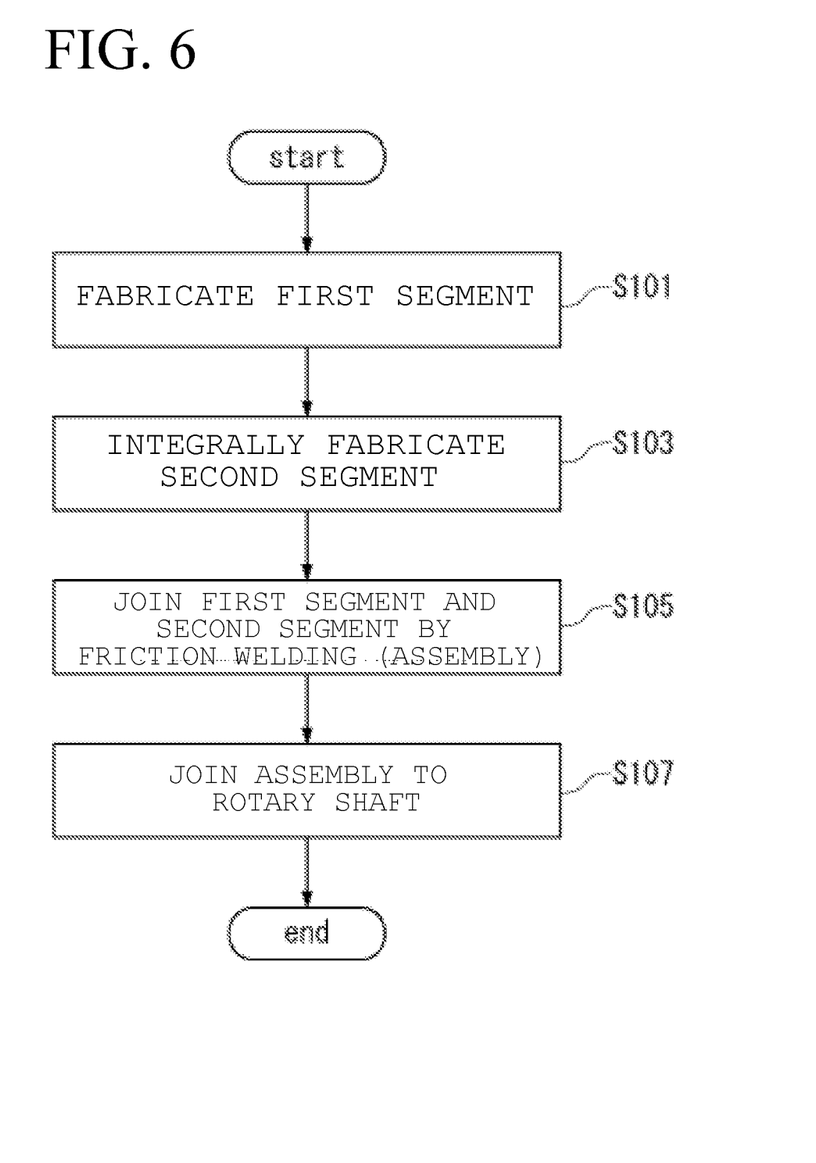
FIG. 6 is a flowchart illustrating the procedure of manufacturing the impeller according to the present embodiment.

First, the first disc portion 31 (first segment SG1) is fabricated by casting, cutting, or the like (FIG. 4A and step S101 in FIG. 6).

Figure 4B:
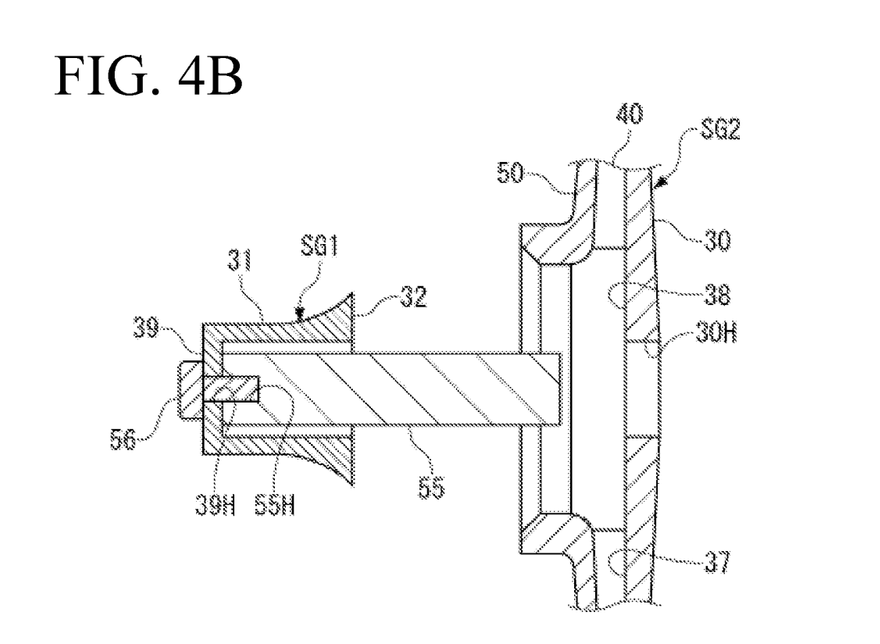

Here, when the first disc portion 31 and the second disc portion 35 are joined by friction welding, it is necessary for at least one of the first disc portion 31 and the second disc portion 35 to perform rotational movement. To achieve the rotational movement, a drive shaft 55 that applies rotational force to the first disc portion 31 is attached as illustrated in FIG. 4B. The first disc portion 31 includes a fixing end 39 to which the drive shaft 55 is attached. The fixing end 39 includes a bolt hole 39H that penetrates through front and rear surfaces of the fixing end 39 and into which a bolt 56 is to be inserted. The fixing end 39 is removed after the friction welding work of the first disc portion 31 and the second disc portion 35 is completed.

In addition, the second segment SG2 in which the second disc portion 35, the blade portions 40, and the cover portion 50 are integrated is fabricated (FIG. 4A and step S103 in FIG. 6). The second segment SG2 is integrally formed by cutting a cast base material.

Note that the first segment SG1 and the second segment SG2 are fabricated in this order for convenience; however, the first segment SG1 and the second segment SG2 may be fabricated in reverse order.

Next, the first segment SG1 and the second segment SG2 are joined by friction welding (step S105 in FIG. 6). The joining by the friction welding goes through the following procedure.

First, the drive shaft 55 is attached to the first disc portion 31 (FIG. 4B). To attach the drive shaft 55, the drive shaft 55 is inserted into an inside of the first disc portion 31 from an opening of the first disc portion 31 until a front end of the drive shaft 55 abuts on the fixing end 39. Next, the fixing bolt 56 is inserted into the bolt hole 39H provided in the fixing end 39, and is screwed into a screw hole 55H provided in the drive shaft 55 (FIG. 4B).

Thereafter, the first disc portion 31 to which the drive shaft 55 has been fixed is assembled to the second disc portion 35 such that the rear end surface 32 and the inner-diameter-side region 38 of the front end surface 37 come into contact with each other. The drive shaft 55 is inserted into an insertion hole 30H into which the rotary shaft 101 of the second disc portion 35 is to be inserted. The drive shaft 55 is drawn out through the insertion hole 30H of each of the first segment SG1 and the second segment SG2; however, a most part of the drive shaft 55 is hidden inside the first segment SG1 and the second segment SG2.

Next, a rotational driving source such as an electric motor is used to rotate the drive shaft 55 at high speed (FIG. 5A) while friction pressure is applied between the rear end surface 32 and the inner-diameter-side region 38 of the front end surface 37 corresponding to the joining layer CL (hereinafter, joining surface). The first disc portion 31 fixed to the drive shaft 55 rotates at high speed along with the rotation of the drive shaft 55 (step S105 in FIG. 6). Note that rotation of the second segment SG2 is restrained.

When the drive shaft 55 continuously rotates, temperature of the joining surface is raised by frictional heat, which results in a high-temperature layer. Thereafter, the rotation of the drive shaft 55 is suddenly stopped, and the joining surface is held for a predetermined time while pressure higher than the previous friction pressure is applied to the joining surface. As a result, solid-phase joining is performed at the joining surface under high temperature and high pressure. The first disc portion 31 and the second disc portion 35 are firmly joined by interatomic attraction through the joining surface.

Figure 5A:
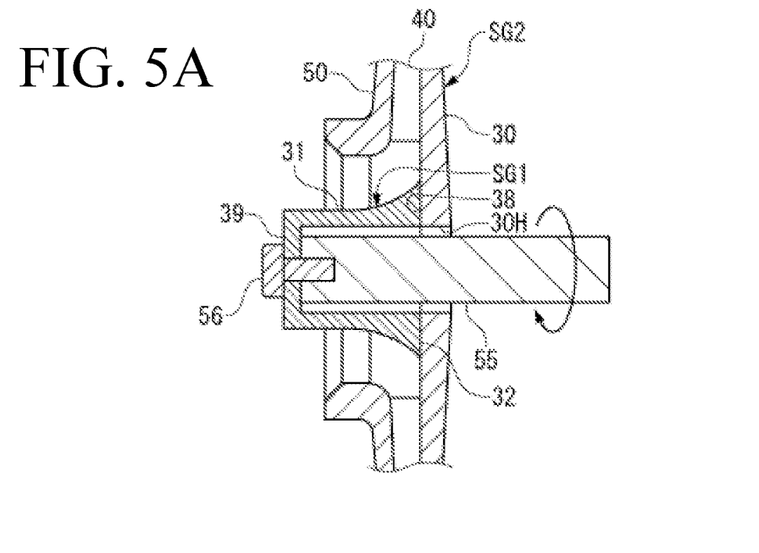
FIGS. 5A and 5B are cross-sectional views illustrating the procedure of manufacturing the impeller according to the present embodiment, following FIGS. 4A and 4B.
Figure 5B:
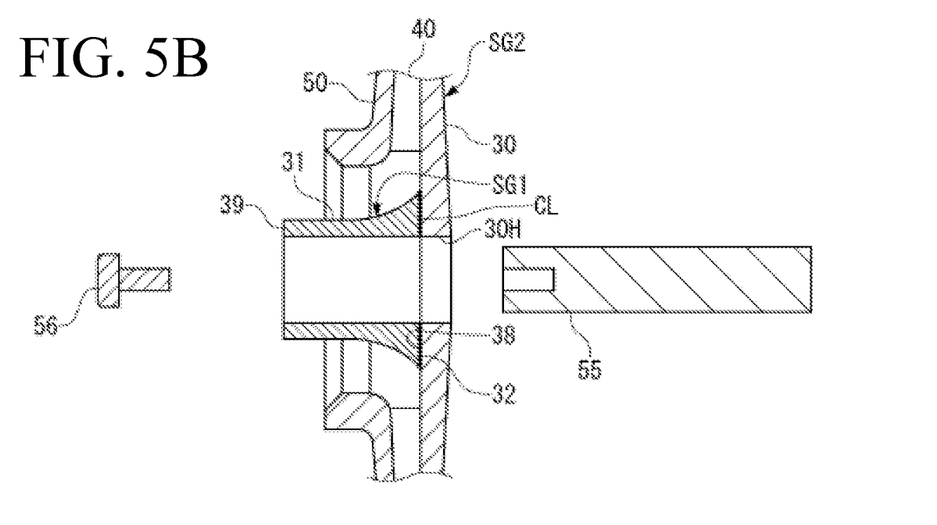

After the friction welding work of the first disc portion 31 and the second disc portion 35 as described above is completed, the drive shaft 55 is removed from the first disc portion 31. Further, a part of the fixing end 39 is removed from the first disc portion 31 by cutting (FIG. 5B).

Moreover, machining is performed on the outer peripheral surface and the inner peripheral surface of the first segment SG1 to increase surface accuracy. In particular, although not illustrated, a burr occurs by the friction welding on the outer diameter side and the inner diameter side of the joining layer CL. Therefore, it is necessary to remove the burr. To perform the machining, the first segment SG1 subjected to the friction welding is preferably fabricated in such a manner that the inner diameter is smaller than a final inner diameter and the outer diameter is larger than a final outer diameter to provide a machining margin.

An assembly in which the first segment SG1 and the second segment SG2 have been joined by the friction welding is obtained through the above-described machining.

Next, the assembly is fitted to the rotary shaft 101 (step S107 in FIG. 6). The fitting can be performed by shrink fitting. In the shrink fitting, the first segment SG1 is heated to cause thermal expansion in the radial direction, and the thermally-expanded first segment SG1 is fitted to the rotary shaft 101. After the first segment SG1 is cooled to the room temperature, the first segment SG1 and the rotary shaft 101 are fitted to each other with an interference.

[Effects of Present Embodiment]

As described above, in the impeller 1, the first segment SG1 and the second segment SG2 are joined with the joining layer CL by the friction welding. The friction welding provides sufficient joining strength even when stainless steel that cannot provide sufficient joining strength in friction stir welding is used for the first segment SG1 and the second segment SG2.

In addition, in the friction welding, there is a part heated to high temperature by frictional heat; however, the part is limited to the joining layer CL and in the vicinity thereof. Accordingly, a range receiving thermal influence is narrow as compared with brazing in which the members are wholly heated in a furnace. The impeller 1 makes it possible to minimize variation of material characteristics caused by joining as well as to suppress deformation caused by application of heat. Thus, according to the present embodiment, it is possible to provide the impeller 1 high in accuracy of the shape and the dimension.

In addition, in the case of the brazing, the work from charge of the impeller in the heat treatment furnace to completion of the brazing takes few days. In contrast, joining by the friction welding is finished in several minutes. Thus, according to the present embodiment, it is possible to manufacture the impeller 1 in a short time.

In the impeller manufacturing method according to the present embodiment, the drive shaft 55 is fixed to the first disc portion 31 configuring the first segment SG1, and the first disc portion 31 rotates through the drive shaft 55. Normally, a member rotating in the friction welding is supported by a chuck provided at a front end of the drive shaft. The present embodiment, however, can achieve the friction welding without including such a chuck.

Further, in the impeller manufacturing method according to the present embodiment, the drive shaft 55 is fixed to the fixing end 39 that has been formed integrally with the first disc portion 31. In this case, the part where the fixing end 39 is provided is eventually unnecessary for the first disc portion 31, and the part does not obstruct the impeller 1 when the part is removed.

Although the preferred embodiment of the present invention has been described above, the configurations described in the above-described embodiment may be selected or appropriately modified without departing from the scope of the present invention.

For example, in the present embodiment, the drive shaft 55 is attached to the first segment SG1 to rotate the first segment SG1. Alternatively, the second segment SG2 may be rotated. Energy necessary for rotation, however, is small when the first segment SG1 is rotated as with the present embodiment because the first segment SG1 is lower in weight than the second segment SG2.

In addition, in the present embodiment, the drive shaft 55 is drawn to the outside of the second segment SG2 through the insertion hole 30H of each of the first segment SG1 and the second segment SG2 into which the rotary shaft 101 is to be inserted. The present invention, however, is not limited thereto. For example, the drive shaft 55 may be fixed to an outside surface of the fixing end 39, and the drive shaft 55 may be disposed outside the first segment SG1 and the second segment SG2.

REFERENCE SIGNS LIST

1 Impeller
3 Induction port
30 Disc portion
30H Insertion hole
31 First disc portion
32 Rear end surface
33 Front end part
34 Outer peripheral surface
35 Second disc portion
36 Rear end part
37 Front end surface
38 Inner-diameter-side region
39 Fixing end
39H Bolt hole
40 Blade portion
41 Front side edge
42 Inside end
43 Side surface
50 Cover portion
51 Bent part
52 Rear end surface
53 Front end edge
55 Drive shaft
55H Screw hole
56 Bolt
100 Centrifugal compressor
101 Rotary shaft
102 Casing
103 Journal bearing
104 Thrust bearing
105 Flow path
106 Suction port
107 Discharge port
A Grip part
CL Joining layer
G Gas
SG1 First segment
SG2 Second segment

The invention claimed is:

1. A method of manufacturing an impeller, the impeller including a disc portion that is fixed to a rotary shaft that rotates around an axis line; a cover portion that is disposed to face the disc portion; a plurality of blade portions that are provided between the disc portion and the cover portion; a first segment that is a portion of the disc portion on one side of an axis line; and a second segment in which a second disc portion that is a portion of the disc portion on another side of the axis line, the cover portion, and the blade portions are integrally configured; and a joining layer configured to join the first disc portion of the first segment and the second disc portion of the second segment, the method comprising:

joining, by friction welding, the first disc portion of the first segment and the second disc portion of the second segment while a part of the first disc portion and a part of the second disc portion each corresponding to the joining layer abut on each other, wherein a drive shaft that applies rotational force is fixed to the first segment, the drive shaft is rotated while friction pressure is applied between the first disc portion and the second disc portion through the drive shaft, and the drive shaft is drawn to outside of the second segment through an insertion hole of each of the first segment and the second segment into which the rotary shaft is to be inserted.

* * * * *